United States Patent
Kolich et al.

(10) Patent No.: US 9,221,374 B2
(45) Date of Patent: Dec. 29, 2015

(54) VENTILATED FOAM SPRING WITH TWISTING ACTION FOR VEHICLE SEAT

(71) Applicant: Ford Global Technologies, LLC, Dearborn, MI (US)

(72) Inventors: Michael Kolich, Windsor (CA); Lorne Joseph Lovelace, Macomb Township, MI (US); Michael Hulway, Grosse Pointe Woods, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 36 days.

(21) Appl. No.: 14/039,167

(22) Filed: Sep. 27, 2013

(65) Prior Publication Data
US 2015/0091362 A1 Apr. 2, 2015

(51) Int. Cl.
| | | |
|---|---|---|
| *B60N 2/70* | (2006.01) | |
| *B60N 2/64* | (2006.01) | |
| *B60N 2/56* | (2006.01) | |
| *F16F 1/373* | (2006.01) | |
| *F16F 1/37* | (2006.01) | |

(52) U.S. Cl.
CPC ............... *B60N 2/70* (2013.01); *B60N 2/5664* (2013.01); *B60N 2/64* (2013.01); *B60N 2/707* (2013.01); *B60N 2/7094* (2013.01); *F16F 1/37* (2013.01); *F16F 1/373* (2013.01); *F16F 2224/0225* (2013.01)

(58) Field of Classification Search
CPC .............. A47C 7/18; F16F 1/37; F16F 1/373; F16F 2224/0225
USPC .............. 5/630, 685, 718–720, 722–724, 727
See application file for complete search history.

(56) References Cited

U.S. PATENT DOCUMENTS

| | | | |
|---|---|---|---|
| 4,194,255 A * | 3/1980 | Poppe | 267/153 |
| 7,841,031 B2 | 11/2010 | Rawls-Meehan | |
| 8,353,501 B2 * | 1/2013 | Poppe | 267/142 |
| 8,746,662 B2 * | 6/2014 | Poppe | 267/142 |
| 2005/0172468 A1 * | 8/2005 | Poppe | 29/91.1 |
| 2006/0282954 A1 * | 12/2006 | Poppe | 5/720 |
| 2007/0001336 A1 | 1/2007 | Nishibori et al. | |
| 2008/0093784 A1 * | 4/2008 | Rawls-Meehan | 267/80 |
| 2009/0049615 A1 * | 2/2009 | Poppe | 5/655.7 |
| 2009/0079119 A1 * | 3/2009 | Poppe | 267/142 |
| 2009/0100603 A1 * | 4/2009 | Poppe | 5/655.9 |

FOREIGN PATENT DOCUMENTS

| | | | |
|---|---|---|---|
| EP | 0872198 A2 | 10/1998 | |
| EP | 2433522 B1 | 5/2013 | |

OTHER PUBLICATIONS

Polyurethane Foam Associate (PFA), "Flexible Polyurethane Foam," In-Touch, vol. 6, No. 1, Jan. 1997 (8 pages).
Commercial Quirurguca Farmaceutica, "Bicofoam Spring 5-S Seating support," http://www.cqfarma.com/index.php/en/homecare/pu-prevention/item/1181-bicofoam-spring-5-s-semp-seating-support, 2010 (2 pages).

* cited by examiner

*Primary Examiner* — Thomas Irvin
(74) *Attorney, Agent, or Firm* — Vichit Chea; Price Heneveld LLP

(57) ABSTRACT

A spring for a vehicle seat comprising a foam body having an outer surface and a plurality of outwardly-extending walls defining a plurality of recesses, wherein top and bottom surfaces of the foam body are operable between an extended position and a compressed position, wherein the plurality of recesses are vertically compressed and the top surface rotates a predetermined distance relative to the bottom surface.

19 Claims, 6 Drawing Sheets

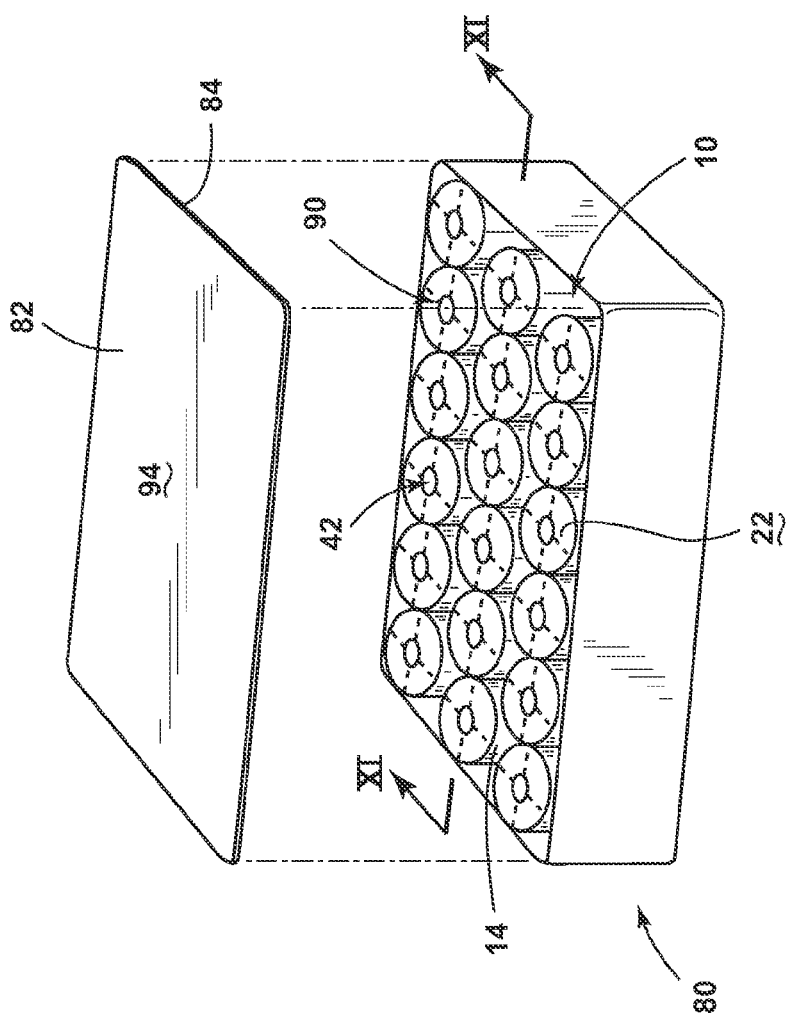
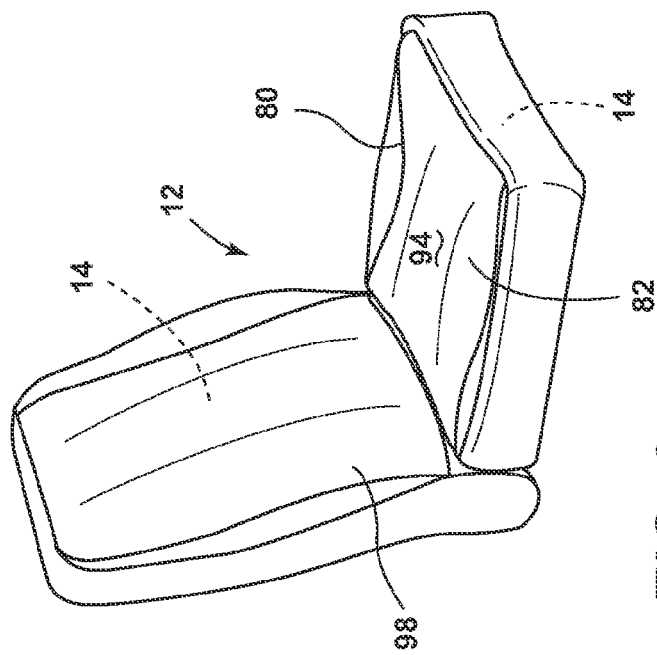

VENTILATED FOAM SPRING WITH TWISTING ACTION FOR VEHICLE SEAT

FIELD OF THE INVENTION

The present invention generally relates to foam springs for vehicle seats, and more specifically, to a foam spring for a vehicle seat that twists as the foam spring is compressed and decompressed.

BACKGROUND OF THE INVENTION

The comfort of occupants in a vehicle is a primary concern in the design of vehicular seating. Various vehicles utilize springs to provide individual points of support to the occupant of the seat. However, conventional springs are limited in that they are designed to provide only axial support to the occupant.

SUMMARY OF THE INVENTION

According to one aspect of the present invention, a seat cushion for a vehicle includes a base and a plurality of foam springs disposed on the base. Each of the plurality of foam springs includes an outer surface defining a plurality of recesses, an inner surface, and top and bottom surfaces. A cover extends over the plurality of foam springs. Each of the plurality of foam springs is individually operable between an uncompressed position and a compressed position. The recesses are substantially compressed and the top surface rotates against the cover a predetermined distance relative to the bottom surface.

According to another aspect of the present invention, a spring for a vehicle seat includes a foam body having an outer surface. A plurality of outwardly-extending walls define a plurality of recesses. Top and bottom surfaces of the foam body are operable between an extended position and a compressed position. The plurality of recesses are vertically compressed and the top surface rotates a predetermined distance relative to the bottom surface.

According to yet another aspect of the present invention, a vehicle seat spring includes a cylindrical foam body having top and bottom surfaces. An outer surface includes a plurality of walls arranged in a polygonal configuration to define a plurality of recesses. The foam body is operable between an uncompressed position and a compressed position. The top surface rotates a predetermined distance relative to the bottom surface.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 9 is a perspective view of a vehicle seat incorporating an embodiment of the foam spring;

FIG. 10 is a partially exploded perspective view of the vehicle seat of FIG. 9.

DETAILED DESCRIPTION OF EMBODIMENTS

Figure 1:
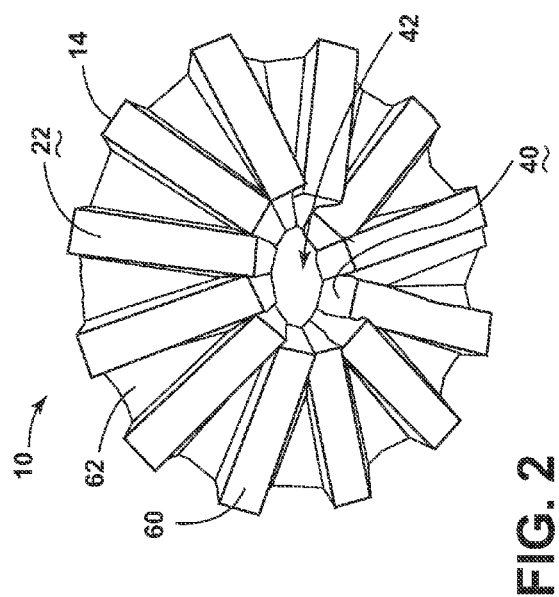
FIG. 1 is a top perspective view of one embodiment of a foam spring of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
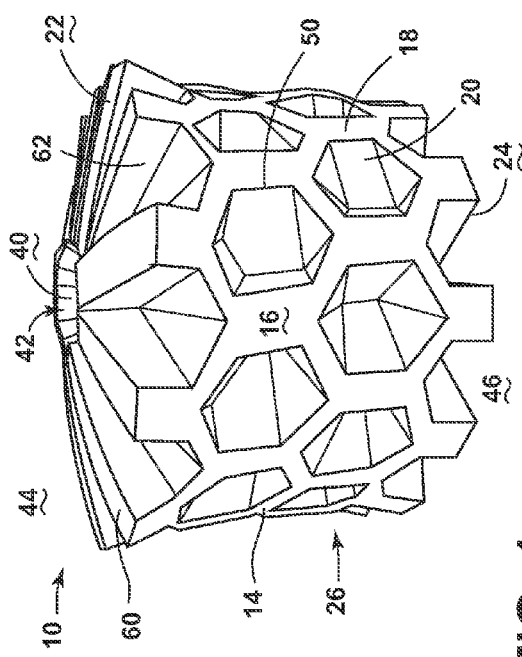
FIG. 2 is a top plan view of the foam spring of FIG. 1.
Figure 3:
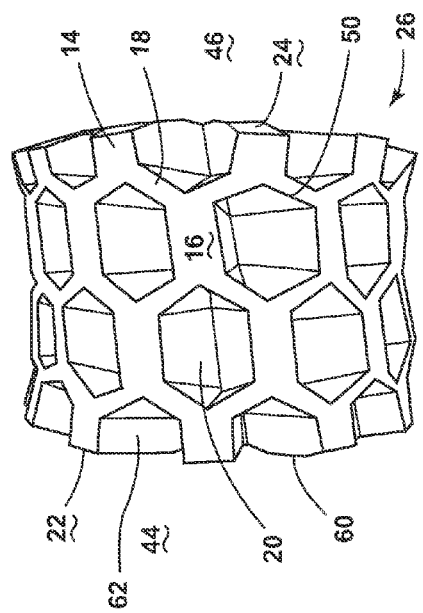
FIG. 3 is a side elevational view of the foam spring of FIG. 1.

As illustrated in FIGS. 1-3, reference numeral 10 generally refers to a foam spring 10 for a vehicle seat 12 (shown in FIG. 9). The foam spring 10 includes a foam body 14 having an outer surface 16 and a plurality of outwardly extending walls 18 defining a plurality of recesses 20. Top and bottom surfaces 22, 24 of the foam spring 10 are operable between an extended position 26 and a compressed position 28, wherein the plurality of recesses 20 are vertically compressed and the top surface 22 rotates a predetermined distance relative to the bottom surface 24 as the foam body 14 moves from the extended position 26 to the compressed position 28.

The foam spring 10 is generally frusto-conical in shape and can also be cylindrically shaped. The foam spring 10 also includes an inner surface 40 that defines an inner cylindrical volume 42, wherein each of the plurality of recesses 20 is tapered toward the inner surface 40. The inner cylindrical volume 42 extends through the foam spring 10 from the top surface 22 to the bottom surface 24. The inner cylindrical volume 42 provides a ventilation path through which air can travel through the foam spring 10 between an upper area 44 above the foam spring 10 and a lower area 46 below the foam spring 10, such that the upper and lower areas 44, 46 can be substantially ventilated during use of the foam spring 10.

Figure 4:
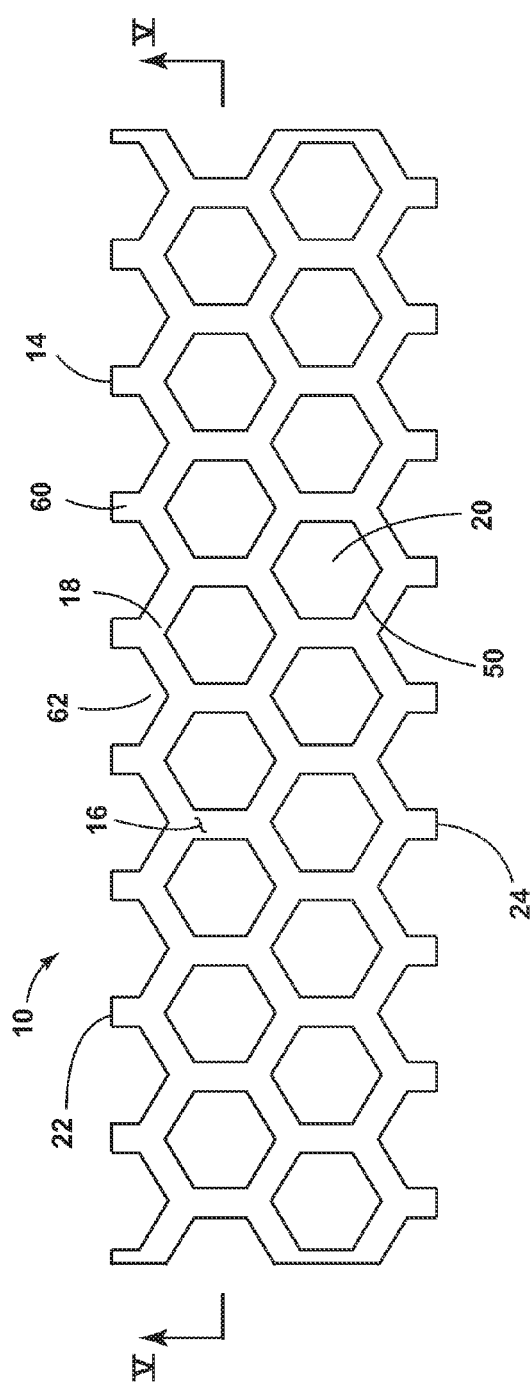
FIG. 4 is an elevational view of an embodiment of the foam spring in an unrolled condition.
Figure 5:
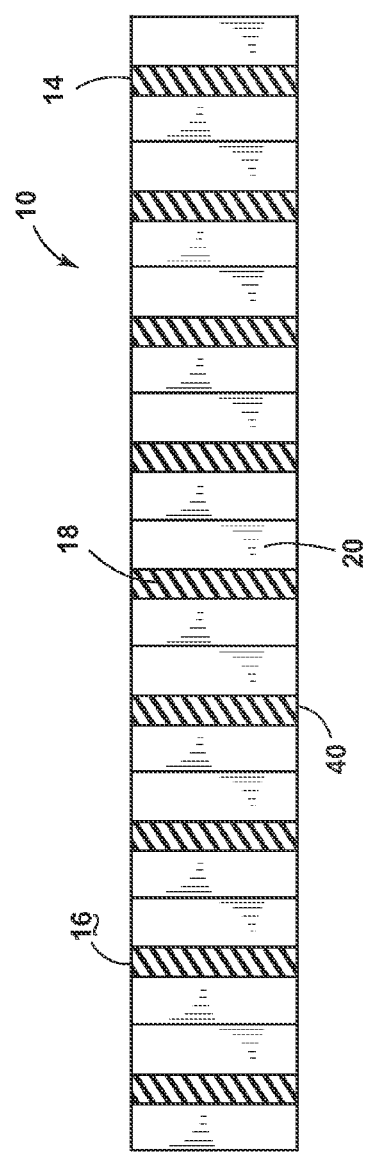
FIG. 5 is a cross-sectional view of the foam spring of FIG. 4 taken along line V-V.

Referring now to FIGS. 4 and 5, the plurality of recesses 20 includes a plurality of tessellated polyhedrons, wherein each of the plurality of tessellated polyhedrons defines one of the plurality of recesses 20. The tessellated polyhedrons can include various shapes, including, but not limited to, octagons, hexagons, triangles, and other shapes that are capable of being tessellated. In various embodiments, each of the polyhedrons can include similar shapes but differing sizes of recesses 20. Alternatively, the recesses 20 can include differing regular and/or irregular polyhedrons spaced throughout the foam spring 10.

As illustrated in FIGS. 2-5, the cylindrical foam spring 10 can be created by rolling a substantially rectangular foam member (FIG. 4) that includes recesses 20 into a circle to create the cylindrical shape of the foam spring 10. In this manner, as the rectangular foam member is rolled, portions of the recesses 20 that are disposed proximate the inner cylindrical volume 42 become compressed and tapered. In certain embodiments, the recesses 20 extend into the inner cylindrical volume 42. In various alternate embodiments, at least a portion of the recesses 20 extend only partially through the foam body 14 and do not extend into the inner cylindrical volume 42.

As illustrated in FIGS. 1-4, the configuration of the recesses 20 can, in various embodiments, create a foam spring 10 that has no linear vertical member extending from the top surface 22 to the bottom surface 24 along the outer surface 16 of the foam spring 10. In such an embodiment, the outer surface 16 of the foam spring 10 extends around openings 50 of each of the plurality of recesses 20.

In the various embodiments, the foam spring 10 can be made of a substantially rigid and compressible foam material that is configured to substantially return to its original shape after being compressed. Such materials can include, but are not limited to, polyurethane foam, latex foam, visco-elastic foam, or other similar foam that is compressible and substantially elastic.

Referring again to FIGS. 1-4, the walls 18 of the foam spring 10 define the plurality of recesses 20 that are arranged in a polygonal pattern. Such patterns can include, but are not limited to, hexagonal patterns, triangular patterns, irregular polygonal patterns, circular patterns, irregular arcuate patterns, or other similar patterns that can form a plurality of recesses 20 within the foam spring 10. The outwardly extending walls 18 that define the recesses 20 extend to the top and bottom surfaces 22, 24 of the foam spring 10 to form a plurality of radial members 60 that extend radially outward on either the top surface 22, the bottom surface 24, or both. In this manner, the top and bottom surfaces 22, 24 define partial recesses 62, wherein each partial recess 62 is substantially similar to a portion of one of the plurality of recesses 20 defined by the outwardly extending walls 18 of the foam spring 10. On the top and bottom surfaces 22, 24, the partial recesses 62 are separated by the plurality of radial members 60 that extend from the inner surface 40 to the outer surface 16 of the foam spring 10.

Figure 6:
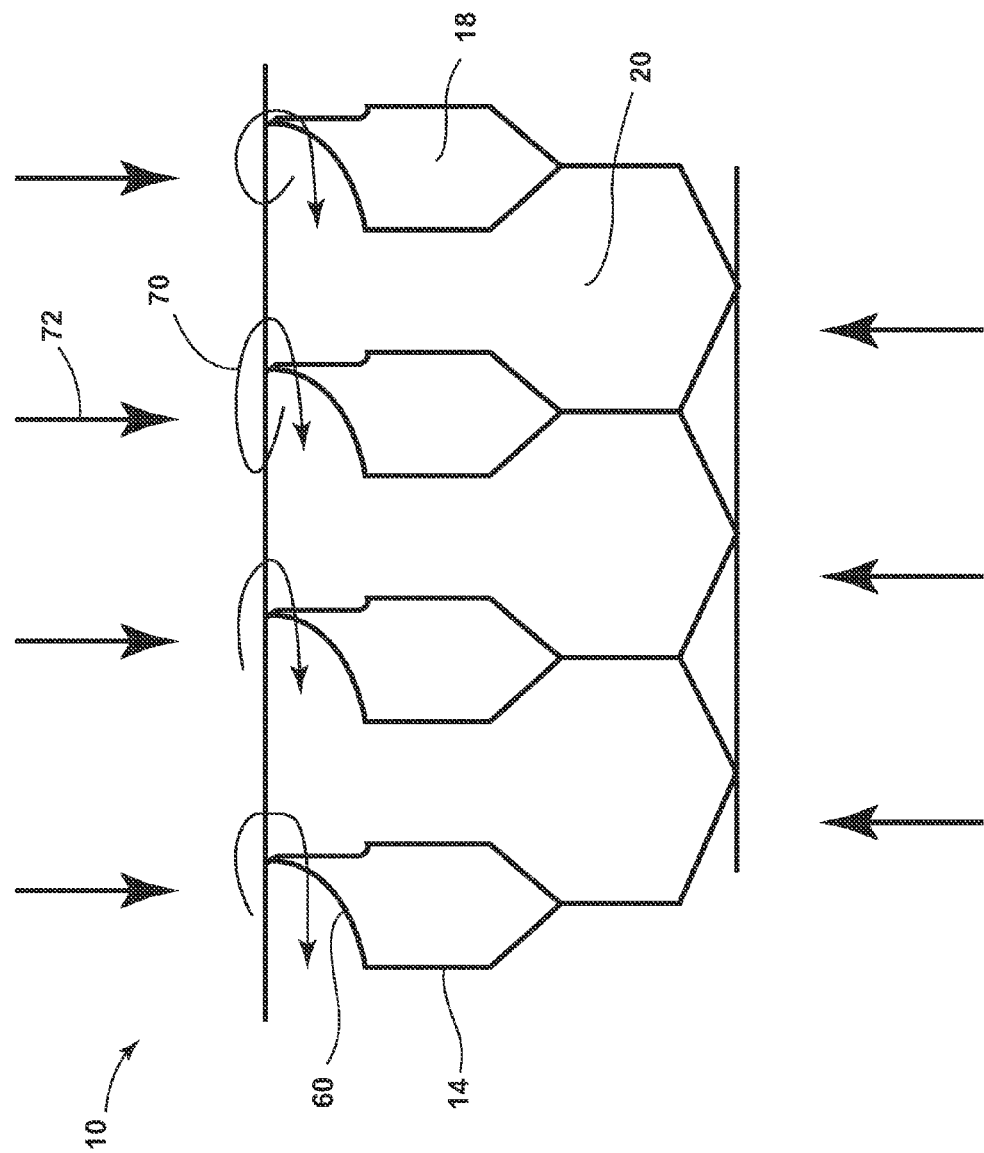
FIG. 6 is a schematic view of another embodiment of the foam spring showing the simultaneous axial and twisting movement of the foam spring.
Figure 8:
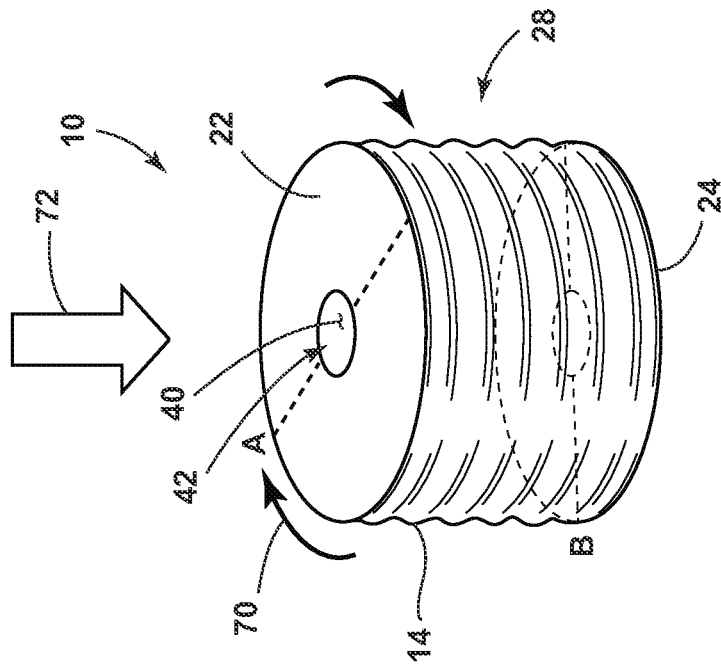
FIG. 8 is a schematic view of the foam spring of FIG. 7 in a compressed position.
Figure 7:
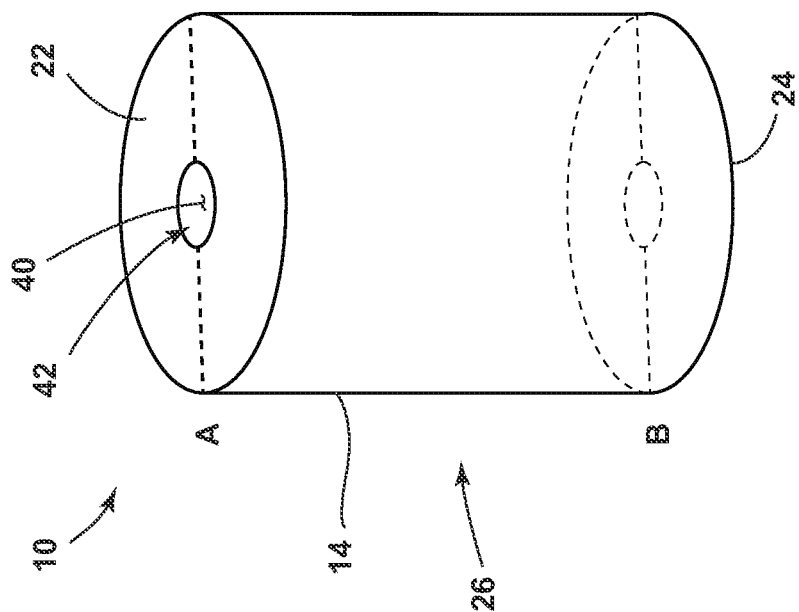
FIG. 7 is a schematic view of an embodiment of the foam spring in an uncompressed position.

Referring now to FIGS. 6-8, the configuration of the foam spring 10, as described above, can create a twisting motion 70 between the top surface 22 and the bottom surface 24 of the foam spring 10, as the foam spring 10 is vertically deformed by a downward force 72 between the extended and compressed positions 26, 28, as shown by lines "A" and "B" in FIGS. 7 and 8. As the downward force 72 is applied and the foam spring 10 is compressed, the top surface 22 of the foam spring 10 can rotate in either a clockwise or counterclockwise direction in relation to the bottom surface 24 of the foam spring 10. In various embodiments, the configuration of the recesses 20 and the outwardly extending walls 18 of the foam spring 10 can substantially determine whether the foam spring 10 rotates clockwise or counterclockwise upon being compressed. As the downward force 72 is lifted, and the foam spring 10 returns to the extended position 26, the top surface 22 of the foam spring 10 rotates in the opposing direction. The downward force 72 upon the foam spring 10 also creates a rotating motion among the individual radial members 60 of the top surface 22 of the foam spring 10, as shown in FIG. 6.

Referring again to FIGS. 7 and 8, in operation, as the foam spring 10 is compressed, the top surface 22 of the foam spring 10 rotates in relation to the bottom surface 24 of the foam spring 10 and the radial members 60 rotate in relation to one another. The more the foam spring 10 is compressed, the greater the rotation between the top and bottom surfaces 22, 24 and the radial members 60. In this manner, when a plurality of foam springs 10 are placed within a seat cushion 80, such as in a vehicle, as the occupant sits upon the seat, the downward force 72 of the weight of an occupant deforms the top surface 22 of each of the foam springs 10, creating a rotating motion as to each of the foam springs 10 that are deformed. The seat cushion 80 is configured such that a covering 82 of the seat includes an underside 84 configured to allow each of the foam springs and the radial members 60 of the foam springs 10 to slidably rotate against the underside 84 of the covering 82. This rotation occurs as each of the foam springs 10 is deformed by the downward force 72 of the occupant sitting upon the seat cushion 80. In this manner, as each of the foam springs 10 rotates, the rotational motion of each of the foam springs 10 can be felt through the top cover of the seat cushion 80. As such, the occupant of the seat receives a massaging sensation due to the rotation of each of the foam springs 10 as each of the foam springs 10 is deformed. The bottom surface 24 is substantially fixed to a portion of the vehicle seat 12 such that as the foam spring 10 is compressed, only the top surface 22 is permitted to rotate. In various embodiments, each of the radial members 60 of the top surface 22 can similarly provide the massaging sensation through the covering 82 of the seat cushion 80 to the occupant of the seat. Accordingly, as the occupant of the seat shifts their weight within the seat, that the springs are continually compressed and decompressed to accommodate the movements of the user. As a consequence, the occupant continually receives the massaging sensation as each of the foam springs 10 continually move between the extended and compressed positions 26, 28, and varying positions therebetween.

Figure 11:
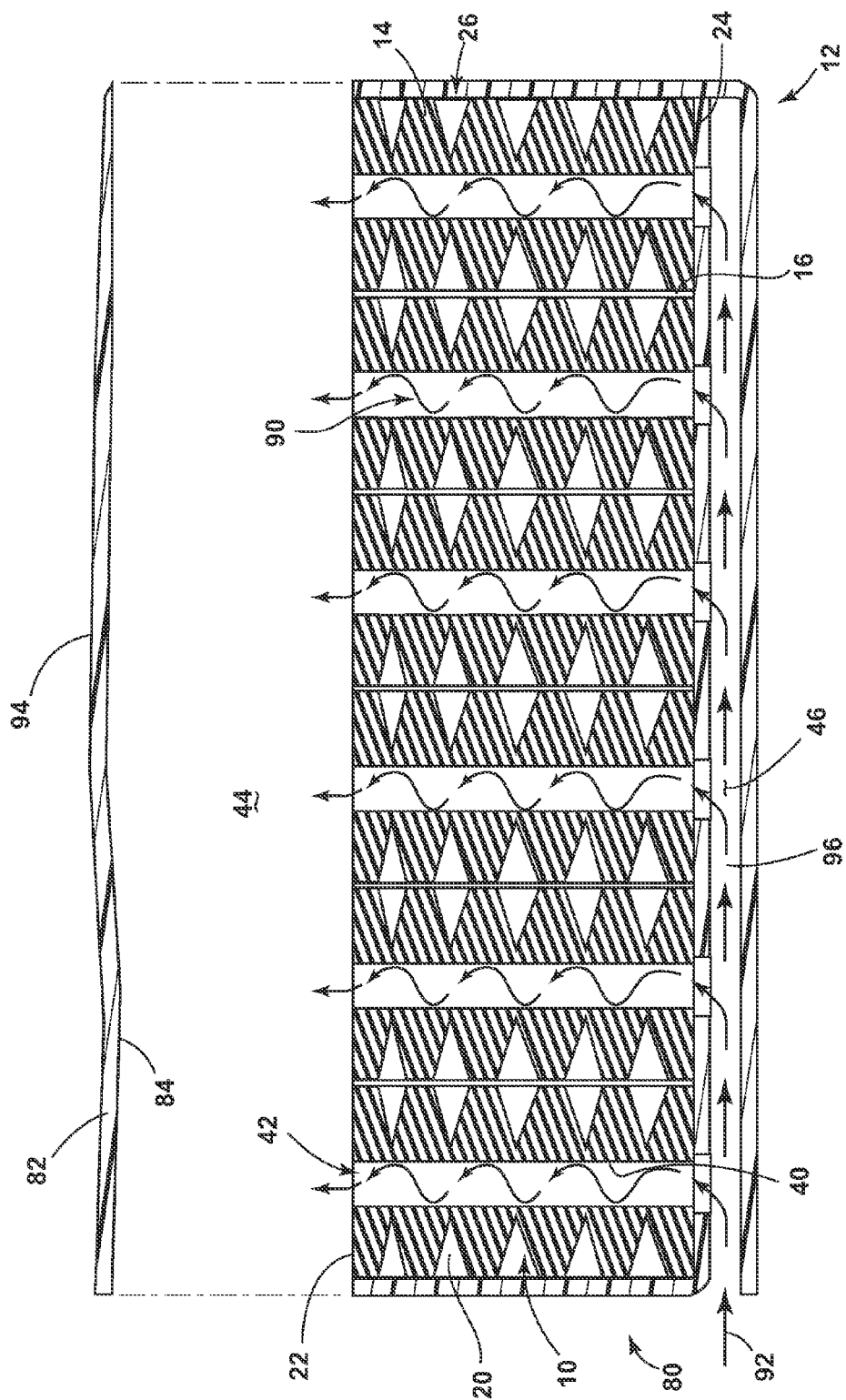
FIG. 11 is a cross-sectional view of the vehicle seat of FIG. 10 taken along line XI-XI.

Referring now to FIGS. 9-11, each of the foam springs 10 can be disposed in a regular or irregular pattern within the seat cushion 80 of the vehicle seat 12. When so configured, the inner surface 40 of each of the foam springs 10 defines an inner ventilation conduit 90. The inner ventilation conduit 90 provides a path for conditioned air 92 to travel between the lower area 46 below the seat cushion 80 to the upper area 44 above the seat cushion 80 to provide cooling to a surface 94 of the seat. In various embodiments, ventilation ducts 96 can be positioned below the seat to supply air through the inner ventilation conduits 90 of the foam springs 10. The foam springs 10 can also be disposed within a seat back 98 to provide the same massaging sensation to the back of an occupant, as described above in reference to the seat cushion 80. In addition, the ventilation ducts 96 can be positioned within the seat back 98 to provide ventilation through the inner ventilation conduits 90 of the plurality of foam springs 10 positioned within the seat back 98.

It will be understood by one having ordinary skill in the art that construction of the described invention and other components is not limited to any specific material. Other exemplary embodiments of the invention disclosed herein may be formed from a wide variety of materials, unless described otherwise herein.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is to be understood that variations and modifications can be made on the aforementioned structure and methods without departing from the concepts of the present invention, and further it is to be understood that such concepts are intended to be covered by the following claims unless these claims by their language expressly state otherwise.

What is claimed is:

1. A seat cushion for a vehicle, the seat cushion comprising:
a base;
a plurality of foam springs disposed on the base, each of the plurality of foam springs including:
an outer surface defining a plurality of recesses;
an inner surface; and
top and bottom surfaces; and
a cover extending over the plurality of foam springs, wherein each of the plurality of foam springs are individually operable between an uncompressed position and a compressed position, wherein the recesses are substantially compressed and the top surface is free of attachment to the cover and slidably rotates against the cover a predetermined distance relative to the cover and the bottom surface, the bottom surface being fixed in relation to the base.

2. The seat cushion of claim 1, wherein the slidable rotation of the top surface of each foam spring can be in any one of a clockwise rotation and a counter clockwise rotation, and wherein each of the plurality of foam springs includes a generally frusto-conical shape.

3. The seat cushion of claim 1, wherein the inner surface defines an inner ventilation conduit, wherein each of the plurality of recesses are tapered toward the inner surface.

4. The seat cushion of claim 3, wherein at least one of the plurality of recesses extend to the inner ventilation conduit.

5. The seat cushion of claim 3, wherein each of the top and bottom surfaces define partial recesses, wherein each partial recess is substantially similar to a portion of one of the plurality of recesses, and wherein the partial recesses are separated by a plurality of radial members extending from the inner surface to the outer surface, and wherein the plurality of radial members of the top surface slidably engages the cover.

6. The seat cushion of claim 4, wherein the plurality of recesses of each foam spring are polygonal cutouts arranged in a tessellated configuration.

7. A vehicle seat spring comprising:
a foam body having an outer surface; and a plurality of outwardly-extending walls defining a plurality of recesses, wherein top and bottom surfaces of the foam body are operable between an extended position and a compressed position, wherein the plurality of recesses are vertically compressed and the top surface slidably rotates against a cover member of a vehicle seat a predetermined distance relative to the fixed bottom surface; and
a plurality of end walls included on both of the top and bottom surfaces, wherein the end walls of the top surface are positioned in an alternating vertical alignment with respect to the end walls of the bottom surface.

8. The vehicle seat spring of claim 7, wherein the foam body is generally cylindrically-shaped.

9. The vehicle seat spring of claim 7, further comprising:
an inner surface defining an inner cylindrical volume, wherein each of the plurality of recesses is tapered toward the inner surface.

10. The vehicle seat spring of claim 9, wherein the plurality of recesses extend into the inner cylindrical volume.

11. The vehicle seat spring of claim 7, wherein the plurality of recesses within the foam body cooperate to define a plurality of polygons arranged in a tessellated pattern.

12. The vehicle seat spring of claim 11, wherein the walls defining the plurality of recesses are arranged in a hexagonal pattern.

13. The vehicle seat spring of claim 7, wherein the foam body includes a generally frusto-conical shape.

14. A vehicle seat spring comprising:
a cylindrical foam body having top and bottom surfaces; and
an outer surface having a plurality of walls defining polygonal recesses, the foam body being operable between uncompressed and compressed positions, wherein the top surface is free of attachment to a seat cover and, wherein the top surface slidably rotates against a seat cover and relative to the fixed bottom surface during operation between the compressed and uncompressed positions.

15. The vehicle seat spring of claim 14, further comprising:
an inner surface defining an inner cylindrical volume, wherein each of the polygonal recesses are tapered toward the inner surface.

16. The vehicle seat spring of claim 15, wherein at least one of the polygonal recesses extends to the inner cylindrical volume.

17. The vehicle seat spring of claim 15, wherein each of the top and bottom surfaces define partial polygonal recesses, wherein each partial polygonal recess is substantially similar to a portion of one of the polygonal recesses, and wherein the partial polygonal recesses are separated by a plurality of radial members extending from the inner surface to the outer surface.

18. The vehicle seat spring of claim 14, wherein the polygonal recesses are arranged on the cylindrical foam body in a tessellated configuration.

19. The vehicle seat spring of claim 18, wherein the walls defining the polygonal recesses are arranged in a hexagonal pattern.

* * * * *